United States Patent [19]

Jasinski

[11] Patent Number: 5,206,576

[45] Date of Patent: Apr. 27, 1993

[54] BATTERY CHARGER

[75] Inventor: Leon Jasinski, Ft. Lauderdale, Fla.

[73] Assignee: Motorola, Inc., Schaumburg, Ill.

[21] Appl. No.: 759,798

[22] Filed: Sep. 13, 1991

Related U.S. Application Data

[63] Continuation of Ser. No. 440,141, Nov. 22, 1989, abandoned.

[51] Int. Cl.5 .................. H01M 10/46; H01M 4/00
[52] U.S. Cl. .................................... 320/2; 320/3; 320/13; 429/27
[58] Field of Search .................... 320/2, 13, 15, 3; 429/27, 72

[56] References Cited

U.S. PATENT DOCUMENTS

| | | | |
|---|---|---|---|
| 3,217,224 | 11/1965 | Sherwood | 320/2 |
| 3,959,706 | 5/1976 | Mabuchi et al. | 320/3 X |
| 4,025,860 | 5/1977 | Shibata et al. | 320/3 |
| 4,177,327 | 12/1979 | Mathews et al. | 429/72 X |
| 4,626,482 | 12/1986 | Hamlen et al. | 429/27 |
| 4,857,885 | 8/1989 | Umerez | 429/27 X |

Primary Examiner—R. J. Hickey
Attorney, Agent, or Firm—Gregg E. Rasor; William E. Koch; Thomas G. Berry

[57] ABSTRACT

A battery charger that allows insertion of a battery for charging. When the battery is inserted it mechanically engages an activation mechanism and electrically couples to an energy source incorporated with the charger. The mechanical engagement of the battery with the activation mechanism causes at least one vent in the energy source to open. The energy source generates power when the at least one activating gas infiltrates into the energy source through the at least one open vent. The power generated by the energy source is coupled to the battery for charging.

10 Claims, 3 Drawing Sheets

BATTERY CHARGER

This is a continuation of application Ser. No. 440,141, filed Nov. 22, 1989 and now abandoned.

FIELD OF THE INVENTION

This invention relates in general to battery chargers, and more particularly toward portable battery chargers, and is specifically directed toward a Zinc-Air portable D.C.-D.C. battery charger.

BACKGROUND OF THE INVENTION

Portable electronic devices typically employ small energy sources (e.g., batteries) that must be recharged from time to time. Fixed (i.e., A.C.-D.C. type) battery charges are not as convenient as portable (i.e, D.C.-D.C. type) battery chargers since they are tethered to an A.C. power source. Conversely, most portable battery chargers are large and heavy since they must carry several energy cells to provide a sufficient charging current. Moreover, contemporary portable battery chargers must themselves be recharged, usually via an A.C.-D.C. charging process. These and other factors reduce the desirability of portable battery chargers since many users feel the detriments mentioned above outweigh the advantage of portability. Thus, what is needed is a small and efficient portable battery charger.

SUMMARY OF THE INVENTION

In carrying out the invention in one form, there is provided a method for charging a battery comprising the steps of inserting the battery in a charging device wherein the battery mechanically engages an activation mechanism and electrically couples to an energy source incorporated with the charging device; opening at least one vent in the energy source in response to the mechanical engagement of the battery with the activation mechanism, the at least one open vent allowing infiltration of at least one activating gas into the energy source resulting in generation of electrical power thereby; and charging the battery using electrical power generated by the energy source.

In carrying out the invention in a second form, there is provided a battery charger comprising receiving means for receiving a battery and electrically coupling the battery to an energy source incorporated with the battery charger; and activating means that opens at least one vent in the energy source in response to the battery mechanically engaging the activating means, the at least one open vent allowing infiltration of at least one activating gas into the energy source resulting in generation of electrical power that charges the battery.

DETAILED DESCRIPTION OF THE INVENTION

Figure 1:
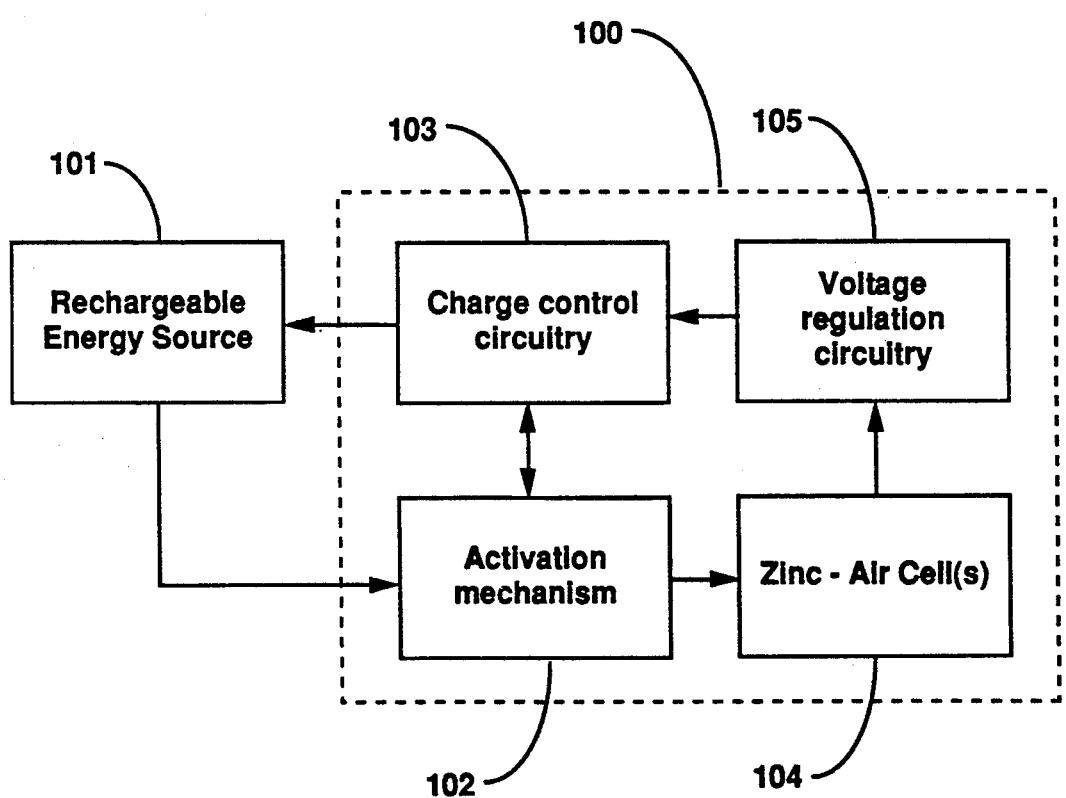
FIG. 1 is a block diagram in accordance with the preferred embodiment.

Referring to FIG. 1, the block diagram of the preferred embodiment of the charging apparatus 100 has a rechargeable energy source 101 coupled to the the activation mechanism 102 and the output of the charge control circuitry 103. The activation mechanism 102 senses the placement of the rechargeable energy source 101 in the charging apparatus 100 and in conjunction with the charge control circuitry 103 controls the activation of the zinc-air cell(s) 104 and amount of charge dispensed to the rechargeable energy source 101. Voltage regulation circuitry 105 provides a means for controlling the voltage presented to the charge control circuitry 103. The voltage regulation circuitry 105 may include a DC-DC step-up or step-down converter to provide enough voltage to charge rechargeable energy sources with different recharge voltage requirements.

Figure 2:
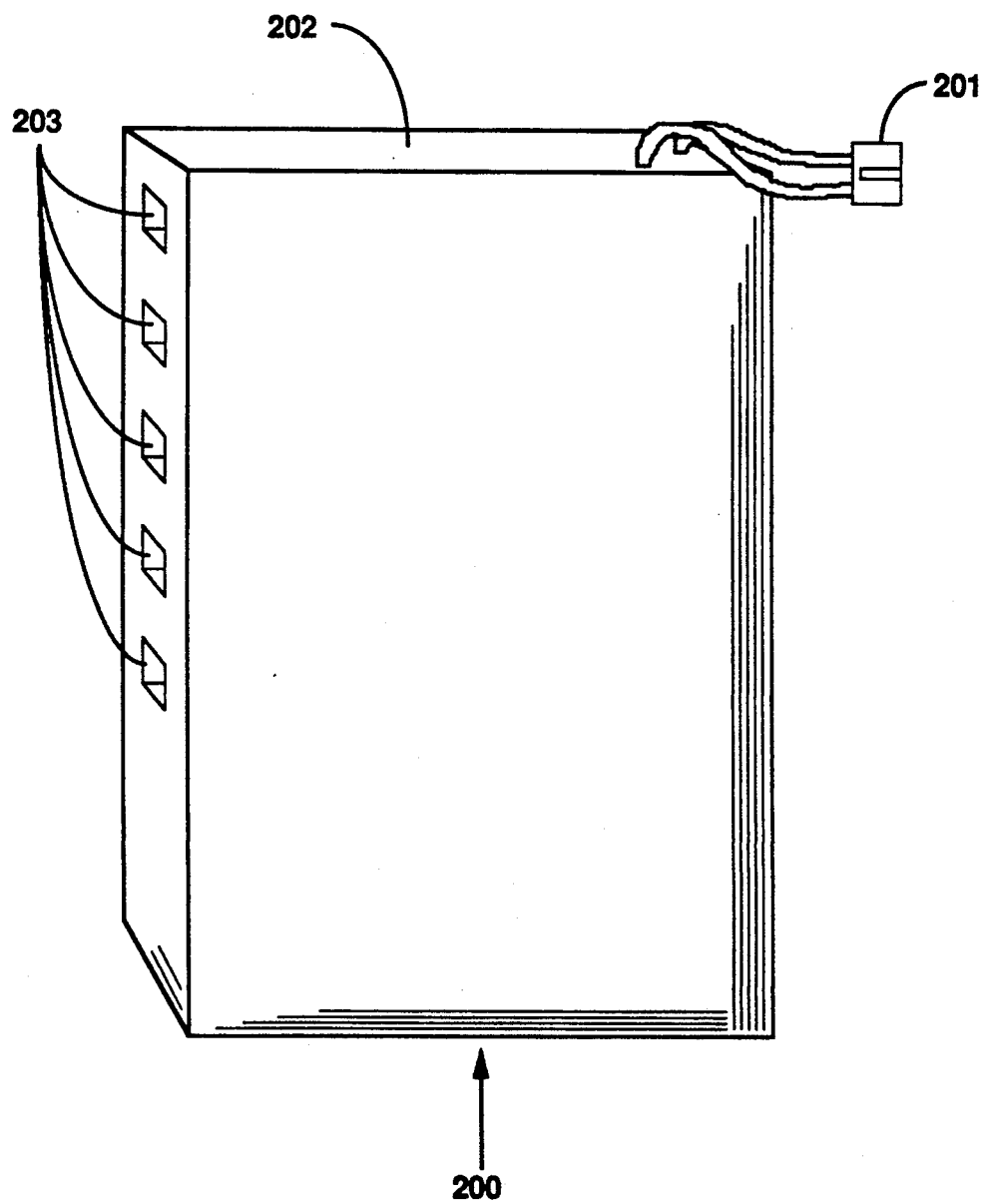
FIG. 2 is a drawing of a typical zinc-air cell.

Referring to FIG. 2, a typical zinc-air battery 200 comprises an electrical connection means 201, and a gas-tight container 202 having a plurality of vents 203 for allowing the infiltration of one or more gases (e.g., air). After manufacture of the zinc-air battery 200, the vents are sealed (not shown), thus preventing activation of the battery 200.

The zinc-air battery 200 is activated by allowing the infiltration of one or more activating gasses into the battery by opening the vents 203. When a sufficient amount of gas has infiltrated and combined with the reactive material (e.g., zinc), the resulting chemical reaction generates electrical power. The reaction can be slowed sufficiently to preserve the unused capacity left in the battery 200 by covering the vents 203 when the battery is not in use. This greatly increases the useful operating life of the battery 200.

Figure 3A:
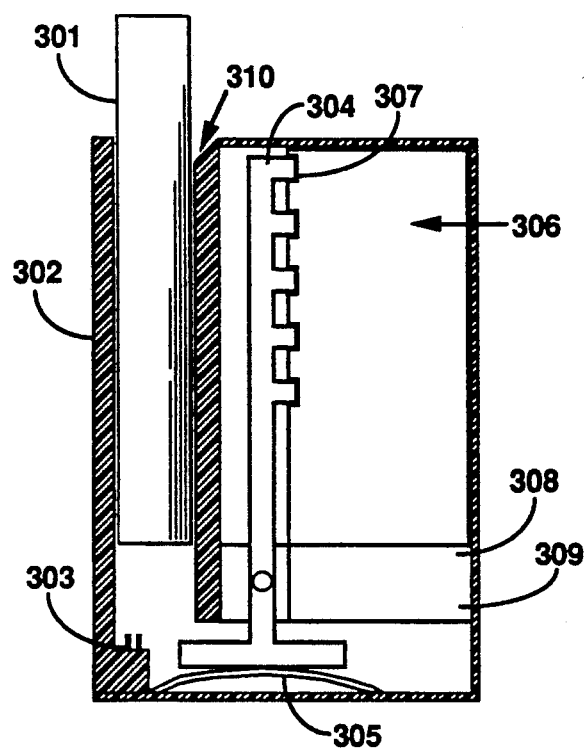
FIG. 3A. is a partial cross section of the preferred embodiment of the charging apparatus with the portable device partially inserted.

Referring to FIG. 3A, the partial cross section of the preferred embodiment shows the portable device 301 containing the energy source (not shown) to be charged, charger housing 302, charging contacts 303, activation mechanism 304, spring 305, zinc-air battery 306 having vents 307, conventional voltage regulation 308, and conventional charging control circuitry 309. The functionality of the portable charging apparatus as a battery charger is independent of the operating state (i.e., being ON or OFF) of the electronic device being charged.

In the position shown, the portable device 301 is being inserted into a cavity 310 designed to properly position the device 301 on the charging contacts 303. Before and during insertion, the activation mechanism 304 is held in a position by the spring 305 such that the vents 307 located on the zinc-air battery 306 are sealed. When the vents 307 are sealed, gasses are prevented from entering the zinc-air battery 306 and it will not generate electrical power.

The activation mechanism 304 shown in this embodiment is rotatably mounted. Alternatively, the activation mechanism 304 could be guided in a linear direction (vertically) or in a more complex implementation it could be driven by an electrical stepping motor or solenoid. The function accomplished by the activation mechanism 304 is to enable or disable the generation of electrical power by the zinc-air battery 306.

Figure 3B:
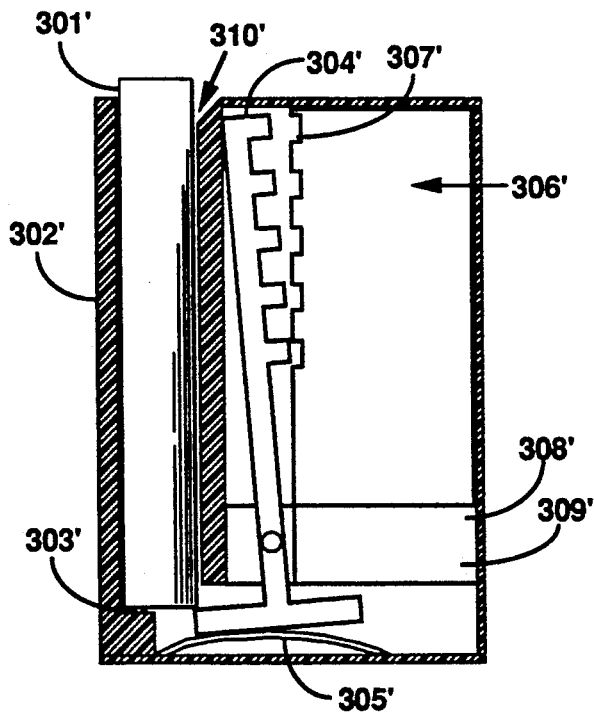
FIG. 3B. is a partial cross section of the preferred embodiment of the charging apparatus with the portable device fully inserted.

Referring to FIG. 3B, the partial cross section of the preferred embodiment shows the portable device 301' containing the energy source (not shown) to be charged, charger housing 302', charging contacts 303', activation mechanism 304', spring 305', zinc-air battery 306' having vents 307', conventional voltage regulation 308', and conventional charging control circuitry 309'.

In the position shown, the portable device 301' has been fully inserted in the cavity 310'. When the portable device 401' is fully inserted, it is retained using the downward force of its mass. In an embodiment where the the portable device 301' would be inserted in a position other that vertical, provisions can be made to lock (not shown) the the portable device 301' into the the cavity 310' in the fully inserted position. In the fully inserted position, the activation mechanism 304' rotates away from the vents 307', allowing gasses to enter the zinc-air battery 306'. This action activates the zinc-air battery 306' and causes the generation of electrical power. The electrical power is applied first to the voltage regulation circuitry 308' then to the charging control circuitry 309'. The voltage regulation circuitry 308' acts to provide the correct voltage for charging the energy source by increasing or decreasing and regulating the output voltage of the zinc-air battery 306'. The regulation of the charging voltage can be performed by a linear or switch-mode regulation circuit. These regulation circuits are available in integrated circuit form an are well known to those skilled in the art. After the output voltage of the zinc-air battery 306' has been regulated by the voltage regulation circuitry 308', it is applied to the charging control circuitry 309' The charging control circuitry 309' senses the amount of charge required by the energy source (or battery) by monitoring the battery and controlling the amount of power delivered to the energy source (or battery). The output of the charging control circuitry 309' is coupled to the energy source via charging contacts 303'. If the energy source is fully charged, the charging control circuitry 309' adjusts the output power accordingly to prevent overcharging and/or damage to the energy source. The charging control circuitry 309' used in this embodiment is conventional in nature and is well known to those skilled in the art.

When the portable device 301' is removed from the cavity 310', the activation mechanism 304' is returned by the spring 305' to a position that seals the vents 307' on the zinc-air battery 306'. This action deactivates the electrochemical reaction in the zinc-air battery 306' by preventing further infiltration of activating gasses.

I claim:

1. A method for charging a battery comprising the steps of:
    (a) inserting the battery in a charging device wherein the battery mechanically engages an activation mechanism and electrically couples to an energy source incorporated with the charging device;
    (b) opening at least one vent in the energy source in response to the mechanical engagement of the battery with the activation mechanism, the at least one open vent allowing infiltration of at least one activating gas into the energy source resulting in generation of electrical power thereby; and
    (c) charging the battery using electrical power generated by the energy source.

2. The method of claim 1, which includes the step of
    (d) monitoring the battery to control the charging thereof.

3. The method according to claim 1, which includes the step of:
    (d) deactivating the energy source by closing the at least one vent in the energy source in response to mechanical disengagement of the battery from the activation mechanism, the at least one closed vent acting to impede infiltration of the at least one activating gas into the energy source.

4. A method for charging a battery within an electronic device, comprising the steps of:
    (a) inserting the electronic device in a battery charging device wherein the battery mechanically engages an activation mechanism and electrically couples to an energy source incorporated with the charging device;
    (b) opening at least one vent in the energy source in response to the mechanical engagement of the electronic device with the activation mechanism, the at least one open vent allowing filtration of at least one activating gas into the energy source resulting in generation of electrical power thereby; and
    (c) charging the battery within the electronic device using electrical power generated by the energy source.

5. The method of claim 4, which includes the step of
    (d) monitoring the battery to control the charging thereof.

6. The method according to claim 4, which includes the step of:
    (d) deactivating the energy source by closing the at least one vent in the energy source in response to mechanical disengagement of the electronic device from the activation mechanism, the at least one closed vent acting to impede infiltration of the at least one activating gas into the energy source.

7. The method of claim 4, which includes the step of:
    (d) operating the electronic device while the battery within the electronic device is being charged.

8. A battery charger, comprising:
    receiving means for receiving a battery and electrically coupling the battery to an energy source incorporated with the battery charger; and
    activating means that opens at least one vent in the energy source in response to the battery mechanically engaging the activating means, the at least one open vent allowing infiltration of at least one activating gas into the energy source resulting in generation of electrical power that charges the battery.

9. The battery charger of claim 8, which includes control means for controlling the charging of the battery.

10. The battery charger according to claim 8, in which the activation means impedes infiltration of the at least one activating gas when the battery is mechanically disengaged from the charging device, thereby deactivating the energy source.

* * * * *

UNITED STATES PATENT AND TRADEMARK OFFICE
CERTIFICATE OF CORRECTION

PATENT NO. : 5,206,576

DATED : April 27, 1993

INVENTOR(S) : Leon Jasinski

It is certified that error appears in the above-identified patent and that said Letters Patent is hereby corrected as shown below:

Column 4, line 22, delete "filtration" and insert --infiltration--.

Signed and Sealed this

Fifth Day of April, 1994

Attest:

BRUCE LEHMAN

Attesting Officer

Commissioner of Patents and Trademarks